3,271,362
PROCESS FOR REACTION OF SILANIC HYDROGEN WITH UNSATURATED ORGANIC COMPOUNDS
Alan J. Chalk, Scotia, and John F. Harrod, Ballston Lake, N.Y., assignors to General Electric Company, a corporation of New York
No Drawing. Filed Feb. 7, 1966, Ser. No. 525,324
10 Claims. (Cl. 260—46.5)

This application is a continuation-in-part of our copending application Serial No. 348,867, filed March 2, 1964, now abandoned.

The present invention relates to an improved method for making organosilicon compositions. More particularly, the invention relates to the production of organosilicon compositions by effecting an addition reaction between a compound containing a silicon-bonded hydrogen (i.e., a silane group, $\equiv$SiH) with a compound containing aliphatic unsaturation (e.g., the ethylenic radical

and the acetylenic radical, —C$\equiv$C—) in the presence of a metallic carbonyl (hereinafter designated as "carbonyl catalyst") selected from the class consisting of cyclopentadienyl cobalt dicarbonyl [$C_5H_5Co(CO)_2$], $Mn_2(CO)_{10}$ and dicobalt octacarbonyl [$Co_2(CO)_8$] soluble in at least one of the aforesaid reactants whereby a carbon-silicon bond is formed between the silicon of the silane group and a carbon of the unsaturated moiety of the unsaturated organic compound.

Desirable products prepared by the addition of compounds containing silane groups with organic compounds containing aliphatic unsaturation (olefinic compounds) have been disclosed in the prior art. This reaction is illustrated by the following equation employing olefinic unsaturation for illustrative purposes:

(1)
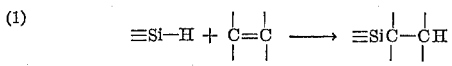

Although the above reactions can be carried out in the absence of catalyst, they are preferably carried out in the presence of catalysts such as organic peroxides, metals, such as palladium and platinum, and platinum-containing materials such as chloroplatinic acid. However, in addition to their execessive cost, the use of these catalysts has been accompanied by certain disadvantages. For example, the use of peroxide catalysts generally causes low yields and undesirable by-products which interfere with the isolation of the desired reaction product. Metallic catalysts such as platinum, particularly platinum in the form of platinized charcoal, although producing better yields, nevertheless the reactions have not been as rapid, nor the yields as high as desired, and the presence of by-products has often presented difficulties.

While chloroplatinic acid is a generally useful catalyst for many reactions within the scope of Equation 1, it also has certain disadvantages, e.g., relative insolubility in olefins and mixtures of olefins and organosilicon compositions containing silane groups. Many of the disadvantages of the metal catalysts are associated with their lack of solubility in non-polar reaction media which results in limitations associated with heterogeneous reactions. Thus, only the surface of an insoluble catalyst can effect reaction which makes for slower, more difficultly controllable and more easily poisoned reactions than does a comparable soluble catalyst. Because of this insolubility, catalyst activity of chloroplatinic acid is materially reduced, even if excess concentrations of the chloroplatinic acid are used. Attempts to improve the solubility of the chloroplatinic acid by the addition of compositions such as alcohols results in side reactions reducing the yield and purity of the final product. Further, the water of hydration and chlorine present in chloroplatinic acid result in the consumption of some of the silicon hydride compound and the introduction of undesirable impurities. If very low concentrations of the chloroplatinic acid are used, higher reaction temperatures must be employed to compensate for the low catalyst concentration. However, higher reaction temperatures usually cause other competing side reactions such as the isomerization of terminal unsaturation to internal unsaturation in olefins, resulting in a less reactive olefinic composition.

The object of the present invention is, therefore, to provide a particular class of metallic carbonyls mentioned above soluble in reaction media of low polarity, such as olefinically unsaturated compounds and organosilicon hydrides.

A further object of the present invention is to provide an improved process for the reaction of a silicon compound containing a silicon-hydrogen linkage with a compound containing aliphatic unsaturation to provide high yields of addition products without the formation of undesirable amounts of by-products.

Another object of the invention is to carry out the addition reaction between a silicon compound containing a silicon-hydrogen grouping with a compound containing aliphatic unsaturation to obtain good yields of product while using low temperature conditions and low catalyst concentrations.

Other objects of the invention will be more apparent from the following description of our invention.

The above objects have been obtained by conducting the reaction described in Equation 1 in the presence of a carbonyl catalyst mentioned above (or mixtures thereof) soluble in one of the reactants, i.e., the silane-containing reactant or the unsaturated compound. The metallic carbonyl achieves the same results as other catalysts, but at a much lower temperature. A further advantage is that this catalyst being unstable at high temperatures, that is, temperatures of above 150° C., is rapidly de-activated at such temperatures and can therefore be "killed," once the reaction is complete. This is of particular importance when the catalyst is used for polymer formation, for instance, in the reaction of tetramethylcyclotetrasiloxane and tetramethyl tetravinylcyclotetrasiloxane, where it is not always desirable to achieve 100% reaction. Thus, frequently 90–95% reaction may result in a useful polymer whereas further reaction results in a more brittle and intractable polymer, more subject to shattering with heat or mechanical shock. The usual platinum catalyst such as chloroplatinic acid does not have this advantage of being capable of being decomposed at elevated temperatures. It should be noted that the carbonyl catalyst does not derive its catalytic activity solely from the fact that it is a cobalt or manganese compound since other metallic compounds, including other metallic carbonyls such as cobalt chloride, cobalt sulfate, cobalt acetate, $Re(CO)_5$, $Mo(CO)_6$, etc., are either not catalysts or else are inoperative under the conditions at which our metallic carbonyls are operative. Even cobalt salts soluble in the reaction mixture, such as the salts of long-chain fatty acids, the acetyl acetonates, etc., have no catalytic activity in the above reaction.

Various methods may be employed to make the carbonyl catalysts, for example, the dicobalt octacarbonyl, catalytically active for and soluble in the above-desired reactants. The book, "Organometallic Chemistry," edited by H. Zeiss, published by Reinhold Publishing Co., New York, N.Y. (1960), pages 468–517, shows various methods for making the carbonyl catalysts. One method for making the dicobalt octacarbonyl catalyst is disclosed by Wender et al., Inorganic Syntheses, 5, 190 (1957). More particularly, in a 500-ml. stainless-steel autoclave are placed 150 ml. of petroleum ether (boiling range about 32 to 63°) and 15 g. of cobalt (II) carbonate (0.126 mol). The autoclave is flushed several times with carbon monoxide and is then filled with an approximately equimolar mixture of carbon monoxide and hydrogen to a pressure of 3500 p.s.i. The autoclave is heated with agitation to 150 to 160° C. and maintained in this temperature range for 3 hours. A maximum pressure (ca. 4300 p.s.i.) is reached at 120° C., but at the end of the reaction the pressure (at 155° C.) is about 3900 p.s.i. The autoclave is cooled to room temperature, the gases are vented carefully, and the autoclave is opened, advantageously in a well-ventilated hood.

The clear, dark solution of dicobalt octacarbonyl is removed from the autoclave, e.g., with a syringe, filtered, and stored for about 18 hours, at a temperature of about 40° C., whereupon large, well-formed crystals of dicobalt octacarbonyl are deposited. The solvent is decanted, and the crystals are dried by passing a stream of dry carbon monoxide over the crystals for several minutes. The dry crystals melt with decomposition at 51 to 52° C. The product is advantageously stored at about 5° C.

The carbonyl catalyst is operative for the addition of an unlimited class of silicon compounds containing a silicon-hydrogen linkage to an unlimited group of organic compounds containing a pair of aliphatic carbon atoms linked by multiple bonds, as illustrated, for example, in Equation 1.

As an illustration of the addition reactions in which the cobalt catalyst is operative, reference is made to Patent 2,823,218—Speier et al. The carbonyl catalysts of the present invention are operative for each of the addition reactions described in the aforementioned reaction. As a further illustration of reactions in which these carbonyl catalysts are applicable, reference is made to Patent 2,970,150—Bailey. By reference both these patents are made part of the disclosures of the instant application.

The organosilicon reactant containing the silicon-hydrogen linkage can be inorganic or organic and can be monomeric or polymeric. The only requirement of the silicon-hydrogen-containing reactant is that the reactant contain at least one silicon-bonded hydrogen atom per molecule, and preferably no more than two hydrogen atoms attached to any one silicon atom.

Among the inorganic monomeric materials which contain silicon-bonded hydrogen atoms and which are useful as reactants in the process of the present invention can be mentioned, for example, trichlorosilane and dibromosilane. Among the operable polymeric inorganic materials can be mentioned pentachlorodisilane, pentachlorodisiloxane, heptachlorotrisilane, etc.

Among the monomeric silicon compounds and organosilicon compounds containing silicon-hydrogen linkages which are operable in the practice of the present invention are those having the formula (2) $\quad (Z)_a Si(H)_b (X)_{4-a-b}$ where X is a member selected from the class consisting of halogen, —OZ (i.e., organoxy) radicals, and —OOCZ (i.e., acyloxy) radicals, Z can be any organic radical, but preferably is a member selected from the class consisting of monovalent hydrocarbon radicals, halogenated monovalent hydrocarbon radicals and cyanoalkyl radicals, $a$ has a value of from 0 to 3, inclusive, $b$ has a value of from 1 to 2, inclusive, and the sum of $a$ plus $b$ is from 1 to 4, inclusive. When more than one Z radical is present in a compound within the scope of Formula 2, the various Z radicals can differ from each other. Among the radicals represented by Z can be mentioned, for example, alkyl radicals, e.g., methyl, ethyl, propyl, octyl, octadecyl, etc. radicals; cycloalkyl radicals such as, for example, cyclohexyl, cycloheptyl, etc. radicals; aryl radicals, e.g., phenyl, naphthyl, tolyl, xylyl, etc. radicals; aralkyl radicals, e.g., benzyl, phenyl, ethyl, etc. radicals; and haloaryl and haloalkyl radicals, e.g., chloromethyl, chlorophenyl, dibromophenyl, etc. radicals. In the preferred embodiment of our invention, the Z radical is methyl or a mixture of methyl and phenyl. In addition to the radicals mentioned above, the Z radical can also be an unsaturated aliphatic radical such as vinyl, allyl, cyclohexenyl, etc. When the Z radical is a radical with aliphatic unsaturation, it is possible to react the silicon compound containing silicon-hydrogen linkages with itself.

Among the specific type of monomeric silicon compounds and organic silicon compounds within the scope of Formula 2 are those having the formula $ZSiHCl_2$, $Z_2SiHCl$, $Z_3SiH$, $ZSiH_2Cl$, $Z_2SiH_2$,
$HSi(OZ)_3$, $H_2Si(OZ)_2$, $ZSi(OZ)_2$, $HSi(OOCZ)_3$,
$ZSiH(OOCZ)_2$ and $SiHCl_3$, where Z is as previously defined. Specific examples are, e.g., $CH_3SiHCl_2$, $C_6H_5SiHCl_2$, $(C_2H_5)_2SiHCl$,
$(CH_3)_2SiHOC_2H_5$, $(C_6H_5)_2SiHCl$, $HSi(OCH_3)_3$,
$HSi(OOCCH_3)_3$, $C_6H_5SiH(OOCC_2H_5)_2$, $SiH_2Cl_2$, etc.

Among the silicon-hydrogen containing compounds useful in the practice of the present invention are those in which each molecule contains more than one silicon atom. Within this category are included organopolysilanes, organopolysiloxanes and various polysilalkalene compounds containing, for example, a —SiCH$_2$Si— grouping or a —SiCH$_2$CH$_2$Si— grouping and polysilphenylene materials which contain the —SiC$_6$H$_4$Si— grouping and the organosilazanes which are characterized by an Si—N—Si linkage in the polymer structure. Among the structurally uncomplicated silicon-hydrogen compounds containing more than one silicon atom are materials having the formulae $Z_2HSiSiZ_3$, $Z_2HSiSiH_2Z$, $Z_3SiOSiHZ_2$,
$ClZ_2SiOSiHCl_2$, $Z_3SiCH_2CH_2SiHZ_2$,
$HZ_2SiC_6H_4SiZ_2H$, $Z_3SiO(ZHSiO)_cSiZ_3$, where Z is as previously defined and $c$ is an integer, for example, an integer equal to from 1 to 10,000 or more.

Among the organopolysiloxanes operable in the practice of the present invention are polymers and copolymers containing up to one or more of the units having the formula $Z_3SiO_{0.5}$, $Z_2SiO$, $ZSiO_{1.5}$ or $SiO_2$ along with at least one unit per molecule having the formula $ZHSiO$, $Z_2HSiO_{0.5}$, $HSiO_{1.5}$, $H_2SiO$ or $ZH_2SiO_{0.5}$ where Z is as previously defined. Among such units may be mentioned $CH_3SiO_{1.5}$, $(CH_3)_2SiO$, $C_6H_5SiO_{1.5}$, $(CH_3)_3SiO_{0.5}$,
$(CH_3)(C_6H_5)SiO$, $CH_3SiH_2O_{0.5}$, $CH_3SiHO$, $C_6H_5SiHO$,
etc.

While any of the silicon-hydrogen compounds described above are operative in the practice of the present invention, some of the preferred silicon-hydrogen compounds are organopolysiloxanes such as organocyclopolysiloxanes having the formula (3) $\quad (ZHSiO)_d$ or an organopolysiloxane polymer or copolymer having the formula (4) $\quad (Z)_e Si(H)_f O_{4-e-f/2}$ where Z is as previously defined, $d$ is as previously defined, $e$ has a value of from 0.5 to 2.49, $f$ has a value of from 0.001 to 1.0 and the sum of $e$ plus $f$ is equal to from 1.0 to 2.5 inclusive. Organopolysiloxanes within the scope of Formulae 3 and 4 are well known in the art and are prepared, for example, by the hydrolysis and condensation of various organochlorosilanes. Thus, where Z is methyl, cyclopolysiloxanes within the scope of Formula 3 can be prepared by hydrolyzing and condensing methyldichlorosilane. Products within the scope of Formula 4 can be prepared by cohydrolyzing and cocondensing a mixture of two or more chlorosilanes, at least one of which contains a silicon-bonded hydrogen atom. For example, compounds within the scope of Formula 4 can be prepared by the cohydrolysis and cocondensation of one or more members selected from the class consisting of trimethylchlorosilane, dimethylchlorosilane, methyltrichlorosilane or silicon tetrachloride with one or more members selected from the class consisting of methyldichlorosilane, dimethylcolorosilane, trichlorosilane, dichlorosilane, or methylchlorosilane.

The unsaturated compounds (other than the organosilicon reactant containing silanic hydrogen) containing olefinic or acetylenic unsaturation which can react with the compounds described above containing the silicon-hydrogen linkage include substantially all of the aliphatically unsaturated compounds known to the art. Thus, the aliphatically unsaturated compound may be a monomeric or polymeric material. The unsaturated compound can contain carbon and hydrogen only, or may also contain other elements. Where the aliphatically unsaturated compound contains an element other than carbon and hydrogen, it is preferred that the other element be oxygen, a halogen, nitrogen or silicon or mixtures of these other elements. The aliphatically unsaturated compound can contain a single pair of carbon atoms linked by multiple bonds or can contain a plurality of pairs of carbon atoms linked by multiple bonds. Among the many unsaturated hydrocarbons applicable to the present invention can be mentioned for purposes of illustration, ethylene, propylene, butylene, octylene, styrene, butadiene, pentadiene, pentene-2, divinylbenzene, vinylacetylene, etc. Preferably, the hydrocarbon is one having no more than 20 to 30 carbon atoms in the chain.

Included among the oxygen-containing unsaturated compounds which can be employed in the practice of the present invention are methylvinyl ether, divinyl ether, phenylvinyl ether, the monoallyl ether of ethylene glycol, allyl aldehyde, methylvinyl ketone, phenylvinyl ketone, acrylic acid, methacrylic acid, methylacrylate, phenylmethacrylate, vinyl acetic acid, vinyl octoate, vinyl acetate, oleic acid, linoleic acid, etc. Unsaurated compounds applicable in the process of the present invention also include acyclic and heterocyclic materials containing aliphatic unsaturation in the ring. Included within this class of compounds are, for example, cyclohexene, cycloheptene, dihydrofuran, dihydropyrene, etc.

In addition to compounds containing carbon, hydrogen and oxygen, compounds containing other elements can also be employed. Thus, halogenated derivatives of any of the materials described above can be employed including the acyl chlorides as well as compounds containing a halogen substituent on a carbon atom other than a carbonyl carbon atom. Thus, applicable halogen-containing materials include, for example, vinyl chloride, the vinyl chlorophenyl ethers, the allyl ester of trichloroacetic acid, etc.

Other types of unsaturated materials useful in the practice of the present invention include unsaturated materials containing nitrogen substituents such as acrylonitrile, allyl cyanide, nitroethylene, etc.; organometallic compounds containing aliphatic unsaturation, e.g., lithium acetylide, divinyl dibutyl germane, vinyl mercuric bromide, dimethyl vinyl borane, ethynyl triphenyl tin, etc.

The unsaturated compounds useful in the practice of the present invention also include polymeric materials containing aliphatic unsaturation such as polymeric hydrocarbons containing olefinic unsaturation, polyester resins prepared from polybasic saturated or unsaturated acids with polyhydric unsaturated alcohols, and the polyester resins prepared by reacting unsaturated polybasic acids with saturated polyhydric alcohols. Thus, a suitable polyester is one prepared by condensing maleic acid with ethylene glycol. Typical of the polymeric hydrocarbons containing aliphatic unsaturation are polymers and copolymers of butadiene, isoprene, styrene, pentadiene, etc.

One of the particularly useful types of unsaturated compounds which can be employed are those compounds containing silicon, such as the materials commonly referred to as organosilicon monomers or polymers. The scope of the organosilicon compounds which are applicable to the claimed process is identical to the scope of the silicon-hydrogen compounds useful in the practice of the present invention. The unsaturated organosilicon compounds are identical to the silicon-hydrogen compounds except that the silicon-bonded hydrogen atom is substituted with a silicon-bonded organic radical containing at least one pair of aliphatic carbon atoms linked with multiple bonds. Preferably, these organosilicon compounds are free of silicon-bonded hydrogen atoms, but it is also possible to employ organo-silicon compounds containing both silicon-bonded hydrogens and silicon-bonded radicals containing silicon-bonded aliphatically unsaturated radicals. The only requirement of these unsaturated organosilicon compounds is that there be at least one aliphatically unsaturated organic radical attached to silicon per molecule. Thus, the aliphatically unsaturated organosilicon compounds include silanes, polysilanes, siloxanes, silazanes, as well as monomeric or polymeric materials containing silicon atoms joined together by methylene or polymethylene groups or by phenylene groups.

Of the broad class of aliphatically unsaturated organosilicon compounds which can be employed in the practice of the present invention, there are three groups of such compounds which are preferred. One of these groups is the monomeric silanes having the formula (5) 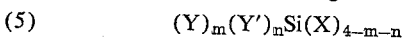 $(Y)_m(Y')_n Si(X)_{4-m-n}$ where X is as previously defined, Y is a monovalent hydrocarbon radical of the scope previously defined for Z, Y' is an organic radical containing at least one pair of aliphatic carbon atoms attached by multiple bonds, $m$ is equal to from 0 to 3, inclusive, $n$ is equal to from 1 to 4 inclusive, and the sum of $m$ plus $n$ is equal to from 1 to 4, inclusive.

A second class of preferred unsaturated organosilicon compounds are those cyclopolysiloxanes having the formula (6)  $(YY'SiO)_d$ where Y and Y' and $d$ are as previously defined. The third group of unsaturated organic silicon compounds preferred in the practice of the present invention are those having the formula (7) 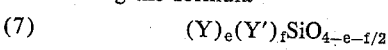 $(Y)_e(Y')_f SiO_{4-e-f/2}$ where Y, Y', $e$ and $f$ are as previously defined.

All of the organic silicon compounds within the scope of Formulae 5, 6, and 7 are well known in the art and are prepared by conventional methods. Included among the organic silicon compounds within the scope of Formulae 5, 6, and 7 are the preferred types of material in which Y is methyl or a mixture of methyl and phenyl and in which Y' is an alkenyl radical, preferably vinyl or allyl.

Within the scope of Formula 5 are silanes such as methylvinyldichlorosilane, vinyltrichlorosilane, allyltrichlorosilane, methylphenylvinylchlorosilane, phenylvinyldichlorosilane, diallyldichlorosilane, vinyl-beta-cyanoethyldichlorosilane, etc. Included among the cyclic products within the scope of Formula 6 are, for example, the cyclic trimer of methylvinylsiloxane, the cyclic pentamer methylvinylsiloxane, the cyclic tetramer of methylvinylsiloxane, the cyclic tetramer of vinylphenylsiloxane, etc.

Included within the scope of Formula 7 are the broad class of well known organopolysiloxanes which can be resinous materials, low viscosity fluids, or high molecular weight gummy materials. These polymeric materials are prepared by the well known method of hydrolysis and condensation of a particular diorganodichlorosilane or by the cohydrolysis and co-condensation of a mixture of several different diorganodichlorosilanes. Thus products within the scope of Formula 7 can be prepared by the hydrolysis and condensation of vinyltrichlorosilane alone, divinyldichlorosilane alone, methylvinyldichlorosilane alone, phenylvinyldichlorosilane alone, or by the co-hydrolysis and co-condensation of any of the aforementioned vinyl-containing chlorosilanes with one or more monoorganotrichlorosilanes, diorganodichlorosilanes, triorganochlorosilanes, or silicon tetrachloride. While the hydrolysis and cohydrolysis above have been described in connection with vinyl-containing organo-silicon compounds it should be understood that in place of the vinyl group can be any silicon-bonded organic radical containing at least one pair of aliphatic carbon atoms linked by multiple bonds.

To effect reaction between the silicon-hydrogen containing reactant and the reactant containing aliphatic unsaturation, the two reactants are merely mixed in the desired proportions and the desired amount of the carbonyl catalyst is added, and the reaction mixture is maintained at the desired reaction temperature for a time sufficient to effect the addition of the silicon-hydrogen bond across the multiple bonds of the aliphatically unsaturated compound. Usually room temperatures (20–30° C.) are adequate for the purpose. The relative amounts of the silicon-hydrogen containing compound and the compound containing multiple bonds can vary within extremely wide limits. In theory, one silicon-hydrogen bond is equivalent to one olefinic double bond or one-half acetylenic triple bond so that this equivalency establishes the general order of magnitude of the two reactants employed. However, for many purposes it may be desirable to employ an excess of one of the reactants to facilitate the completion of the reaction or to insure that the reaction product still contains either silicon-hydrogen bonds in the unreacted state, or still contains one or more pairs of carbon atoms linked by multiple bonds. In general, however, the ratios of the reactants are selected so that there are present from about 0.005 to 20 silicon-hydrogen linkages available in one reactant per pair of aliphatic carbon atoms linked by double bonds in the other reactant or from about 6.06 to 15 silicon-hydrogen linkages in one reactant per pair of aliphatic carbon atoms linked by triple bonds in the other reactant.

The amount of carbonyl catalyst employed in effecting the addition reaction can vary within extremely wide limits. While the carbonyl catalyst is operative in small amounts, the desired addition reaction is generally effected more rapidly with higher concentrations. Thus, on a weight basis, we can use from about 0.001 to 2 percent by weight, or higher of the carbonyl catalyst, based on the total weight of the unsaturated compound and the silicon hydride.

Because of handling difficulties, the carbonyl catalyst is advantageously employed as a solution in a diluent such as petroleum ether, or the catalyst in the reactants. Other diluents are aromatic hydrocarbons, including benzene, toluene and xylene. However, aliphatic solvents such as aliphatic mineral spirits are preferred. The solvent can be employed in an amount equal to from 10 to 10,000 parts, by weight, solvent per part of the carbonyl catalyst.

To effect the addition reaction by means of the carbonyl catalyst, the two reactants and the catalyst (in a diluent) are thoroughly mixed and maintained at the reaction temperature for a time sufficient to effect the reaction. Because of the high activity of the carbonyl catalyst, many of the reactions, begin taking place at room temperature as soon as the catalyst is mixed with the reactants. Accordingly, the reaction temperature can be room temperature or even a temperature as low as about 0° C. On the other hand, reaction temperatures on the order of 50 to 80° C. or somewhat higher can be employed. The time required for effecting the addition reaction depends upon a number of factors such as the particular reactants employed, and the amount of carbonyl catalyst employed. Thus, reaction times can occur from a few minutes up to 12 or more hours depending on reaction conditions.

In some cases, in addition to employing the catalyst in a solvent, it is often desirable to employ also a solvent for one or both of the reactants. Again the amount of solvent employed in this case is not critical and can vary within reasonable limits except for economic considerations. Any solvent can be employed which will dissolve the desired reactant or reactants and which also is inert to the reactants and catalyst under the conditions of the reaction.

The following examples are illustrative of the practice of our invention and are not intended for purposes of limitation. All parts are by weight unless otherwise indicated. The $Co_2(CO)_8$ catalyst used, was that previously described but as about a 5 weight percent solution in toluene.

*Example 1*

To one part of an equimolar mixture of tetramethyl tetravinyl cyclotetrasiloxane

and tetramethyl tetrahydrogen cyclotetrasiloxane

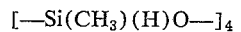

was added under nitrogen 0.02 part of the toluene solution of dicobalt octacarbonyl. The mixture was completely miscible and after a few minutes the addition reaction took place with considerable force at room temperature to produce a hard, solid, coreaction addition production.

*Example 2*

Example 1 was repeated but using in place of the dicobalt octacarbonyl catalyst, 0.01 part of a 12% solution of chloroplatinic acid in ethyl alcohol. Miscibility was limited to the formation of a cloudy solution. After 3 hours at room temperature the reaction had proceeded to a limited extent to produce a soft gel.

*Example 3*

Example 1 was repeated using a higher concentration of dicobalt octacarbonyl (0.08 part of the toluene solution). Again the mixture was completely miscible and reaction occurred at room temperature to give a hard reaction product in just a few minutes.

*Example 4*

Example 2 was repeated using a higher concentration of chloroplatinic acid, namely, 0.1 part of the 12% alcohol solution. This mixture was completely immiscible and to obtain a solid product, the reaction had to be continued for about 15 hours at room temperature.

*Example 5*

When diphenylsilane [$(C_6H_5)_2SiH_2$] was substituted for the tetramethyl cyclotetrasiloxane in the reaction described in Example 1, and the same proportions of ingredients and the same condiitons used, there was obtained an addition reaction at room temperature between the hydrogens of the diphenylsilane and the olefinic unsaturation of the tetravinyl tetramethylcyclotetrasiloxane.

*Example 6*

To about 6.5 parts phenyldichlorosilane and about 11 parts octene-1 was added under nitrogen about 0.22 part of the solution of dicobalt octacarbonyl in toluene. After about 30 minutes, there was an exothermic reaction raising the temperature to about 35° C. After allowing the reaction mixture to remain at room temperature for a period of about 15 hours, the reaction mixture was then treated to isolate phenyl octyldichlorosilane in better than a 98% yield based on the phenyldichlorosilane.

Example 7

In this example, about 3.7 parts triethylsilane was added to about 11 parts octene-1 containing about 0.22 part of the solution of dicobalt octacarbonyl in toluene, the addition being carried out under nitrogen and at a temperature of about 23° C. After about 60 hours at room temperature, triethyl octylsilane was obtained in about a 100° yield based on the triethylsilane.

Example 8

To about 5 parts triethoxysilane was added about 11 parts octene-1 containing 0.22 part of the solution of dicobalt octacarbonyl in toluene. This addition was conducted at temperature of −20° C. under nitrogen. The temperature was then allowed to rise to about 20° C. and the reaction mixture was kept at this temperature for about 2 hours. After about 20° C. for 15 hours and then for about 5 minutes at 130° C. this resulted in the formation of octyl triethoxysilane in about an 82 percent yield based on the triethoxysilane.

Example 9

To 5 parts of triethylsilane and 15 parts of octene-1 was added 0.1 part of a 12 weight percent solution of chloroplatinic acid in ethanol. 0.5 part ethanol was added to achieve sufficient miscibility to produce a cloudy yellow colored solution. Gas was evolved as the alcohol reacted with the silane and after five minutes complete miscibility had been achieved. After 26 minutes at room temperature, the mixture increased in temperature as the bulk of the reaction occurred, resulting in the disappearance of 76% of the silicon hydride. A further 15 hours at room temperature resulted in the disappearance of 88% of the silicon hydride. Raising the temperature to approximately 130° C. (reflux) for one hour did not further affect the 12% of silicon hydride remaining. Analysis of the product revealed that only 48% of the triethylsilane was converted to the desired triethyl octylsilane, the remainder appearing as a complex mixture of by-products.

Example 10

An equimolar mixture of tetramethyl tetravinyl cyclotetrasiloxane and tetramethyl tetrahydrogen cyclotetrasiloxane was combined under nitrogen with dimanganese decacarbonyl [$Mn_2(CO)_{10}$] so that the carbonyl catalyst was present in an amount equal to 0.005 gram per 1 ml. of the mixture of siloxanes. The mixture of ingredients which was completely miscible was heated for 20 minutes at 125° C. to form a hard, solid coreaction addition product derived from the addition of the silanic hydrogen to the olefinic unsaturation.

As pointed out above, the dicobalt octacarbonyl catalyst is able to effect the addition reaction at room temperature in a relatively short period of time. By using the cyclopentadienyl cobalt dicarbonyl, one is able to reduce the activity of the carbonyl catalyst at room temperature, whereby the cobalt carbonyl catalyst becomes a latent catalyst subject to increasing its reactivity by the application of heat, e.g., temperatures of about 75° to 100° C. It is believed that when the cyclopentadienyl cobalt dicarbonyl is used, under the conditions of reaction, it is in equilibrium with the dicobalt octacarbonyl in accordance with the following equation:

$$4C_5H_5Co(CO)_2 \rightleftharpoons 2(C_5H_5)_2Co + Co_2(CO)_8$$

The following example illustrates the latent catalytic character of the cyclopentadienyl cobalt dicarbonyl.

Example 11

An equimolar mixture of tetramethyl tetravinyl cyclotetrasiloxane and tetramethyl tetrahydrogen cyclotetrasiloxane was prepared. To this mixture under a blanket of nitrogen was added the above-identified cyclopentadienyl cobalt dicarbonyl in such an amount that there was present 0.005 gram of the latter catalyst per 1 ml. of the mixture of polysiloxanes. Little, if any, reaction occurred at room temperature. However, when the mixture of ingredients was heated for 10 minutes at 100° C., the reaction took place readily with the formation of the same type of product as was obtained in Example 1.

The metallic carbonyl catalysts have been illustrated as useful in the addition of various types of silicon-hydrogen compounds to various types of compounds containing a pair of aliphatic carbon atoms linked by multiple bonds. These multiple bonds can be either olefinic or acetylenic double bonds. While the above examples have illustrated a number of reactants subject to addition by the carbonyl catalyst, it should be understood that this catalyst is applicable to the broad class of addition reactions previously described. The conditions and proportions of ingredients and reactants can also be varied widely without departing from the scope of the invention, keeping in mind the stoichiometric requirements of the addition reaction.

The products prepared by the addition reaction of the present invention have various utilities, depending on the particular product formed. Thus, the products formed from a monomeric silane containing a silicon-bonded hydrogen atom and silicon-bonded hydrolyzable groups and olefinic material such as, for example, the product prepared by adding methyldichlorosilane to cyclohexene may be hydrolyzed and condensed in conventional fashion to form various organopolysiloxanes having utility as insulation, water-repellants, etc. Similarly, the products prepared by reacting an organopolysiloxane containing silicon-bonded hydrogen groups with an organopolysiloxane containing silicon-bonded unsaturated groups can be used in conventional silicone polymer applications. Thus, it is entirely possible to prepare these "addition polymers" in any shape desired in supported or unsupported state. Thus, those materials which are rubbery polymers can be used as gaskets and the like similar to conventional silicone rubbers. Those materials which are resinous in nature can be formed as insulation on insulated electrical conductors and the conductors can be used for conventional applications. The monomeric materials prepared by the addition reaction of the present invention are obviously valuable as intermediates in the preparation of more complicated products.

What we claim as new and desire to secure by Letters Patent of the United States is:

1. A process for the production of organo-silicon compositions containing carbon-silicon bonds which comprises contacting (a) a silicon compound containing at least one hydrogen atom attached to silicon per molecule with (b) a compound containing aliphatic carbon atoms linked by multiple bonds, in the presence of a metallic carbonyl selected from the class consisting of dicobalt octacarbonyl, cyclopentadienyl cobalt dicarbonyl, and $Mn_2(CO)_{10}$.

2. A process for the production of organosilicon compositions containing carbon-silicon bonds which comprises contacting (a) an organosilicon compound having the formula $$(Z)_a Si(H)_b X_{(4-a-b)}$$

where X is selected from the class consisting of halogen, organoxy radicals, and acyloxy radicals, Z in an organic radical, $a$ has a value from 0 to 3, inclusive, $b$ has a value from 1 to 2, inclusive, and the sum of $a+b$ is from 1 to 4, inclusive, with (b) a compound containing aliphatic carbon atoms linked by multiple bonds, in the presence of a metallic carbonyl selected from the class consisting of dicobalt octacarbonyl, cyclopentadienyl cobalt dicarbonyl, and $Mn_2(CO)_{10}$.

3. The process for the production of organo-silicon compositions containing carbon-silicon bonds which comprises contacting (a) an organosilicon compound having the formula $$(Z)_e Si(H)_f O_{(4-e-f)/2}$$

where Z is a monovalent organic radical, $e$ has a value from 0.5 to 2.49, inclusive, $f$ has a value from 0.001 to 1.0, inclusive, and the sum of $e+f$ is equal to from 1.0 to 2.5, inclusive, with (b) a compound containing aliphatic carbon atoms linked by multiple bonds, in the presence of a metallic carbonyl selected from the class consisting of dicobalt octacarbonyl, cyclopentadienyl cobalt dicarbonyl and $Mn_2(CO)_{10}$.

4. A process for the production of a polymeric organopolysiloxane containing carbon-silicon bonds which comprises contacting (a) an organopolysiloxane having the formula $$(Y)_e(Y')_f SiO_{(4-e-f)/2}$$

with (b) a compound having the formula $$(Z)_e Si(H)_f O_{(4-e-f)/2}$$

where $Z$ and $Y$ are selected from the class consisting of monovalent hydrocarbon radicals, halogenated monovalent hydrocarbon radicals, and cyanoalkyl radicals, $Y'$ is an organic radical containing aliphatic carbon atoms linked by multiple bonds, $e$ has a value from 0.5 to 2.49, inclusive, $f$ has a value from 0.001 to 1.0, inclusive, and the sum of $e+f$ is equal to from 1.0 to 2.5, inclusive, in the presence of a metallic carbonyl selected from the class consisting of dicobalt octacarbonyl, cyclopentadienyl cobalt dicarbonyl, and $Mn_2(CO)_{10}$.

5. The processs for the production of organosilicon compositions containing carbon-silicon bonds which comprises contacting, in the presence of a metallic carbonyl selected from the class consisting of dicobalt octacarbonyl, cyclopentadienyl cobalt dicarbonyl, and $Mn_2(CO)_{10}$ a mixture of ingredients comprising (a) tetramethyl cyclotetrasiloxane and (b) tetramethyl tetravinyl cyclotetrasiloxane.

6. A process as in claim 5 in which the metallic carbonyl is dicobalt octacarbonyl.

7. The process as in claim 5 in which the metallic carbonyl is cyclopentadienyl cobalt dicarbonyl.

8. The process as in claim 5 in which the metallic carbonyl is $Mn_2(CO)_{10}$.

9. The process for producing an organosilicon composition containing silicon-carbon bonds which comprises contacting (a) octene-1 with (b) triethylsilane in the presence of dicobalt octacarbonyl.

10. The process for obtaining organosilicon compositions containing carbon-silicon bonds which comprises contacting (a) triethoxysilane with (b) octene-1 in the presence of dicobalt octacarbonyl.

References Cited by the Examiner

UNITED STATES PATENTS

| | | | |
|---|---|---|---|
| 2,970,150 | 1/1961 | Bailey | 260—46.5 |
| 2,974,133 | 3/1961 | Wiberg et al. | 260—94.9 |
| 3,198,766 | 8/1965 | Nitzsche et al. | 260—46.54 |

LEON J. BERCOVITZ, *Primary Examiner.*

M. I. MARQUIS, *Assistant Examiner.*